(12) United States Patent
An et al.

(10) Patent No.: US 10,510,996 B2
(45) Date of Patent: Dec. 17, 2019

(54) BATTERY

(71) Applicant: LG CHEM, LTD., Seoul (KR)

(72) Inventors: Yoo Jin An, Daejeon (KR); Hyung Ku Yun, Daejeon (KR); In Gu An, Daejeon (KR); Dong Myung Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 9 days.

(21) Appl. No.: 15/740,962

(22) PCT Filed: Feb. 20, 2017

(86) PCT No.: PCT/KR2017/001861
§ 371 (c)(1),
(2) Date: Dec. 29, 2017

(87) PCT Pub. No.: WO2017/164520
PCT Pub. Date: Sep. 28, 2017

(65) Prior Publication Data
US 2019/0006637 A1    Jan. 3, 2019

(30) Foreign Application Priority Data

Mar. 24, 2016 (KR) .................. 10-2016-0035196

(51) Int. Cl.
*H01M 2/02* (2006.01)
*H01M 10/052* (2010.01)
*H01M 2/10* (2006.01)

(52) U.S. Cl.
CPC ............. *H01M 2/022* (2013.01); *H01M 2/02* (2013.01); *H01M 2/1022* (2013.01); *H01M 10/052* (2013.01); *H01M 2220/30* (2013.01)

(58) Field of Classification Search
None
See application file for complete search history.

(56) References Cited

U.S. PATENT DOCUMENTS

| | | | |
|---|---|---|---|
| 9,455,423 | B2 | 9/2016 | Etzkorn et al. |
| 9,768,451 | B2 | 9/2017 | Etzkorn et al. |
| 9,768,467 | B2 | 9/2017 | Yamazaki et al. |

(Continued)

FOREIGN PATENT DOCUMENTS

| | | |
|---|---|---|
| EP | 2985805 A1 | 2/2016 |
| JP | 06-333543 A | 12/1994 |

(Continued)

OTHER PUBLICATIONS

Extended European Search Report for European Application No. 17770491.3, dated May 3, 2018.

(Continued)

*Primary Examiner* — Jonathan Crepeau
(74) *Attorney, Agent, or Firm* — Birch, Stewart, Kolasch & Birch, LLP

(57) ABSTRACT

According to the present invention, grip feeling of an electronic device to which the battery is mounted may be improved by optimizing a shape of a battery, and miniaturization of the electronic device may be promoted at the same time. In order to achieve the above-described object, a battery is disclosed, the battery including: a first surface having a circumference of a closed curve having a curve; a second surface having a circumference of a closed curve having a curve; and a volume portion configured to connect the first surface to the second surface and defining a volume, wherein at least one of the first surface and the second surface has a circumference of the closed curve defined by connecting ends of each of two curves curved in the same direction to each other, and the first surface has an area different from that of the second surface.

12 Claims, 2 Drawing Sheets

(56) References Cited

U.S. PATENT DOCUMENTS

| | | |
|---|---|---|
| 10,263,223 B2 | 4/2019 | Takahashi et al. |
| 2003/0017372 A1 | 1/2003 | Probst et al. |
| 2006/0141354 A1 | 6/2006 | Kwon |
| 2011/0059344 A1 | 3/2011 | Kawase et al. |
| 2012/0015236 A1 | 1/2012 | Spare |
| 2012/0183825 A1 | 7/2012 | Lee et al. |
| 2014/0315091 A1 | 10/2014 | Yamazaki et al. |
| 2015/0086842 A1 | 3/2015 | Kang et al. |
| 2015/0111088 A1 | 4/2015 | Hiroki et al. |
| 2015/0155530 A1 | 6/2015 | Takahashi et al. |
| 2015/0179989 A1 | 6/2015 | Luo et al. |
| 2015/0214567 A1 | 7/2015 | Etzkorn et al. |
| 2015/0214578 A1 | 7/2015 | Spare |
| 2016/0043355 A1 | 2/2016 | Byun et al. |
| 2016/0133987 A1 | 5/2016 | Choi et al. |
| 2016/0365584 A1 | 12/2016 | Etzkorn et al. |
| 2017/0373345 A1 | 12/2017 | Yamazaki et al. |

FOREIGN PATENT DOCUMENTS

| | | |
|---|---|---|
| JP | 11-273709 A | 10/1999 |
| JP | 2002-170538 A | 6/2002 |
| JP | 2009-110832 A | 5/2009 |
| JP | 2012-151110 A | 8/2012 |
| JP | 2014-225445 A | 12/2014 |
| JP | 2015-130331 A | 7/2015 |
| JP | 2016-27579 A | 2/2016 |
| JP | 2016-72209 A | 5/2016 |
| KR | 10-2006-0059705 | 6/2006 |
| KR | 10-2013-0038927 A | 4/2013 |
| KR | 10-2013-0124921 A | 11/2013 |
| KR | 10-2015-0015320 A | 2/2015 |

OTHER PUBLICATIONS

International Search Report for PCT/KR2017/001861 (PCT/ISA/210) dated May 31, 2017.

BATTERY

CROSS-REFERENCE TO RELATED APPLICATION

The present application claims the benefit of the priority of Korean Patent Application No. 10-2016-0035196, filed on Mar. 24, 2016, which is hereby incorporated by reference in its entirety.

TECHNICAL FIELD

The present invention relates to a battery, and more particularly, to a shape of a battery.

BACKGROUND ART

In recent years, as various electronic devices have diverse shapes when compared to the existing electronic devices, diversity in shape of batteries provided with the electronic devices also becomes important. That is, when it is intend to install a typical battery having a simple shape in an electronic device having various shapes different from those of the existing electronic device, an empty space may be generated within the electronic device due to mismatch between the shape of the battery and the internal space of the electronic device, in which the battery is accommodated. As a result, this becomes a retrogressive factor against customer demands in recent trends in which the electronic device is miniaturized in size so as to facilitate portability and mobility of the electronic device. Thus, studies on development of a battery having various shapes are being conducted continuously.

The battery may be diversely changed in shape according to characteristics of the electronic device on which the battery is mounted, and particularly, electronic devices such as mobile phones usable in hand-held manner are often manufactured to have curved surfaces so as to improve user's grip feeling. Accordingly, the battery mounted within the electronic device may also be manufactured to have a curved surface. Therefore, to improve the grip feeling of the electronic device, the battery mounted within the electronic device is also required to be changed in shape so as to be suitable for the electronic device.

DISCLOSURE OF THE INVENTION

Technical Problem

Thus, an object of the present invention is to improve grip feeling of an electronic device and promote miniaturization of the electronic device by optimizing a shape of a battery.

Technical Solution

According to one aspect of the present invention in order to achieve the above-described object, a battery is provided, the battery including: a first surface having a circumference of a closed curve having a curve; a second surface having a circumference of a closed curve having a curve; and a volume portion configured to connect the first surface to the second surface and defining a volume, wherein at least one of the first surface and the second surface has a circumference of the closed curve defined by connecting ends of each of two curves curved in the same direction to each other, and the first surface has an area different from that of the second surface.

Each of the curves may be a circular arc.

The two circular arcs may have the same curvature center.

The two circular arcs may have the same central angle.

Each of the first surface and the second surface may have a circumference of the closed curve defined by connecting ends of each of two circular arcs curved in the same direction to each other, and at least one curvature radius of two circular arcs constituting the circumference of the first surface may be different from each curvature radius of two circular arcs constituting the circumference of the second surface.

All curvature radii of the two circular arcs constituting the circumference of the first surface may be less than each curvature radius of the two circular arcs constituting the circumference of the second surface.

The first surface may be parallel to the second surface, and each of the first surface and the second surface may have a circumference of the closed curve defined by connecting ends of each of two circular arcs having the same curvature center and the same central angle to each other when the first surface and the second surface are vertically viewed.

The volume portion may be defined by connecting the circumference of the first surface to the circumference of the second surface in a straight line.

Advantageous Effects

According to the present invention, the electronic device to which the battery is mounted may be improved in grip feeling and promoted in miniaturization by optimizing the shape of the battery.

MODE FOR CARRYING OUT THE INVENTION

Hereinafter, an embodiment of the present invention will be described with reference to the accompanying drawings. However, the present invention is not limited or restricted to the following embodiment.

Figure 1:
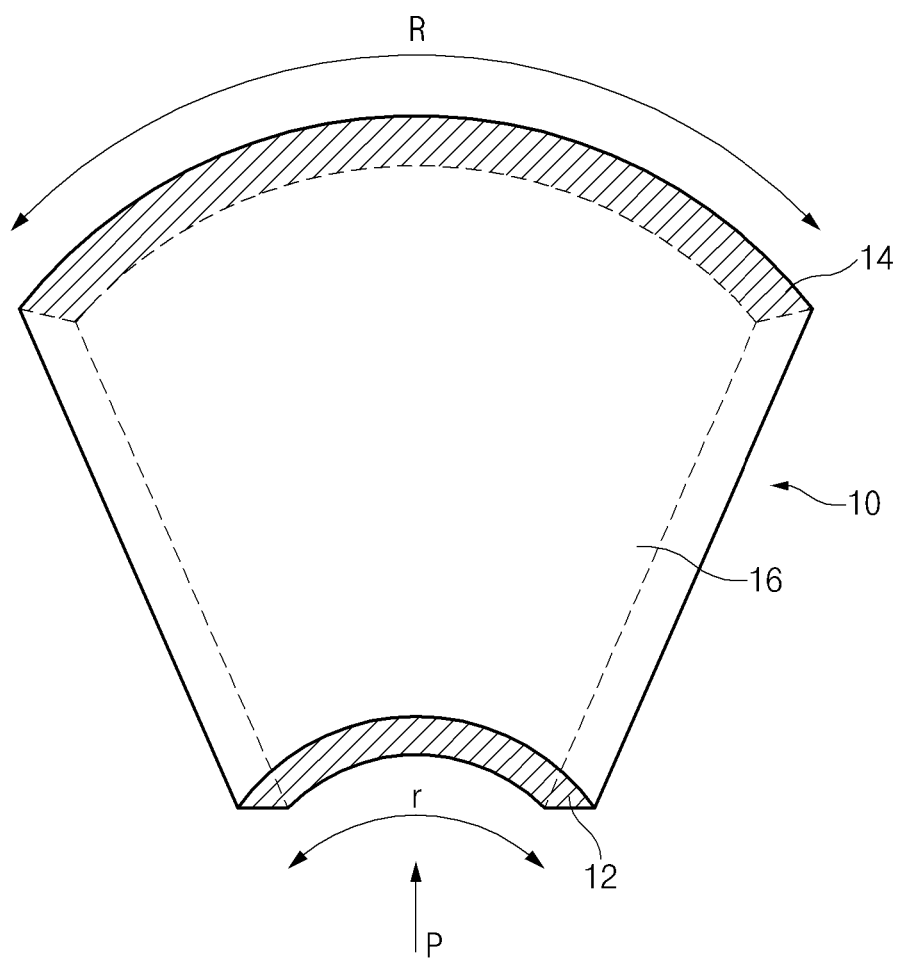
FIG. 1 is a view illustrating a shape of a battery according to an embodiment of the present invention.

FIG. 1 is a view illustrating a shape of a battery according to an embodiment of the present invention.

Referring to FIG. 1, the present invention is provided with a battery 10. The battery according to the present invention may be a secondary battery. Also, the battery according to the present invention may be a battery mounted on an electronic device.

The battery 10 includes a first surface 12 defining a bottom surface of the battery 10, a second surface 14 defining a top surface of the battery 10, and a volume portion 16 connecting the first surface 12 to the second surface 14 and defining a volume of the battery 10. That is, the first surface 12 and the second surface 14 are defined at both ends of the volume portion 16. Here, the volume portion 16 may connect a circumference of the first surface 12 to a circumference of the second surface 14.

Here, the expressions of the 'top surface' or the 'bottom surface' in the specification are merely named according to a direction of the battery illustrated in the drawings of the specification, and should not be construed as a direction of the battery in a state in which the battery is used by being mounted on the electronic device and the like.

Figure 2:
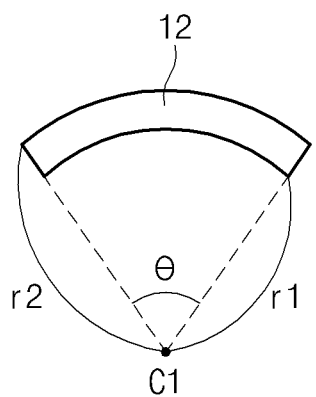
FIGS. 2 and 3 are views illustrating examples of a first surface and a second surface of the battery according to an embodiment of the present invention, respectively.
Figure 3:
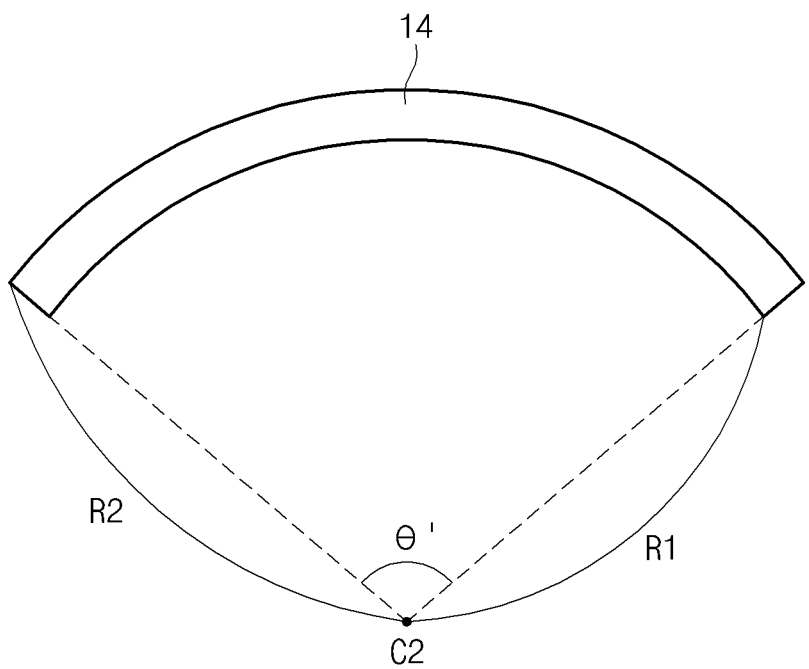

Also, each of the first surface 12 and the second surface 14 has a circumference of a closed curve. FIGS. 2 and 3 are views illustrating examples of the first surface and the second surface of the battery according to an embodiment of the present invention, respectively. Referring to FIGS. 2 and 3, for example, at least one of the first surface 12 and the second surface 14 may have a circumference of a closed curve defined by connecting ends of each of two curves curved in the same direction to each other. Also, according to the present invention, the first surface 12 may have an area different from that of the second surface 14. When the first surface 12 has the area different from that of the second surface 14, the first surface 12 may mean a surface having a smaller area, and the second surface 14 may mean a surface having a larger area.

Also, when the first surface 12 or the second surface has the circumference of the closed curve defined by connecting ends of each of two curves curved in the same direction to each other, at least one of the two curves may be a circular arc. In FIGS. 2 and 3, all the two curves defining a portion of the circumference of the first surface 12 or the second surface 14 are illustrated to be circular arcs. That is, FIG. 2 illustrates an example in which the two curves defining the portion of the circumference of the first surface 12 respectively have circular arc shapes with the curvature radii r1 and r2, and FIG. 3 illustrates an example in which the two curves defining the portion of the circumference of the second surface 14 respectively have circular arc shapes with the curvature radii R1 and R2. However, the present invention is not limited to the above-described circular arc, but an only portion of the two curves defining a portion of the circumference of the first surface or the second surface may be the circular arc.

When all the two curves defining the portion of the circumference of the first surface 12 or the second surface 14 are circular arcs, the two circular arcs may have the same curvature center C as illustrated in FIGS. 2 and 3. That is, FIGS. 2 and 3 illustrate an example in which the two circular arcs respectively defining the portions of the circumference of the first surface 12 or the second surface 14 have the same curvature center C1 or C2.

Also, when the two curves defining the portion of the circumference of the first surface 12 or the second surface 14 are circular arcs, and the circular arcs have the same curvature center C, these two circular arcs may have the same central angle. FIGS. 2 and 3 illustrates an example in which the two circular arcs respectively defining the portions of the circumference of the first surface 12 or the second surface 14 have the same central angle θ or θ'.

Also, as illustrated in FIGS. 2 and 3, circular arcs defining the portions of the circumferences of the first surface 12 and the second surface 14 respectively have of curvature radii r1, r2, R1, and R2, a relationship in size between the curvature radii may be defined as follows.

At least one curvature radius of the two circular arcs constituting the circumference of the first surface 12 may be different from all the curvature radii of the two circular arcs constituting the circumference of the second surface 14. That is, referring to FIGS. 2 and 3, at least one of the curvature radii r1 and r2 may be different from all curvature radii R1 and R2. Similarly, at least one curvature radius of the two circular arcs constituting the circumference of the second surface 14 may be different from all the curvature radii of the two circular arcs constituting the circumference of the first surface 12. That is, referring to FIGS. 2 and 3, at least one of the curvature radii R1 and R2 may be different from all curvature radii r1 and r2.

Also, when the first surface 12 has the area less than that of the second surface 14, all curvature radii of the two circular arcs constituting the circumference of the first surface 12 may less than each curvature radius of the two circular arcs constituting the circumference of the second surface 14. That is, referring to FIGS. 2 and 3, the curvature radii r1 and r2 may be less than the curvature radii R1 and R2.

Also, the first surface 12 and the second surface 14 of the battery 10 according to the embodiment of the present invention may be parallel to each other. Also, when the first surface 12 and the second surface 14 are vertically viewed (for example, when the battery is viewed in a direction P with respect to FIG. 2), two circular arcs constituting each circumference of the closed curves of the first surface 12 and the second surface 14 (that is, total four circular arcs) may have the same central angle and the same point as the curvature center. Also, the first surface 12 may has the same central angle as the second surface 14 (i.e., θ=θ').

Also, as described above, the volume portion 16 connects the first surface 12 to the second surface 14 and defines a volume of the battery 10. Here, the volume portion 16 may connect the first surface 12 to the second surface 14 in a straight line. For example, the volume portion 16 may connect the circumference of the first surface 12 to the circumference of the second surface 14 in the straight line as illustrated in FIG. 1.

Also, the battery 10 according to the embodiment of the present invention may have a portion of a circular cone shape. That is, as illustrated in FIGS. 1 to 3, when the first surface 12 and the second surface 14 are parallel to each other, and the volume portion 16 connects the circumference of the first surface 12 to the circumference of the second surface 14 in the straight line while the two circular arcs constituting each circumference of the closed curves of the first surface 12 and the second surface 14 (that is, total four circular arcs) have the same central angle and the same point as the curvature radius, the battery according to the embodiment of the present invention may have a shape, which is defined by a portion of a circumference of the remaining portion (a kind of truncated cone) after cutting an upper portion of the circular cone. Alternatively, the battery 10 may have a portion of a cone shape.

In case of an electronic device mainly used in a state of being held by a hand of a user, the electronic device is often manufactured to have a curved surface so as to improve grip feeling of the electronic device in use (there are various forms such as a loudspeaker). Therefore, a battery mounted on the electronic device may be also manufactured to have a curved surface.

However, the human hand may have different curvature radii at respective sections in view of the structure of the human body. Thus, if curved surfaces disposed at upper and lower sides of the electronic device have the same curvature radius when the electronic device has a curved surface, the improvement of the grip feeling for the electronic device may be limited in degree. Therefore, it is preferable that the electronic device has curvature radii different from each other on top and bottom curved surfaces thereof to maximize the grip feeling thereof (for example, particularly required for an electronic device such as a loudspeaker). Therefore, it is preferable that the battery mounted on the electronic device has curvature radii different from each other on top and bottom curved surfaces thereof.

Thus, when the battery according to the present invention have the above-described shape, since the battery has the curved surface on the whole and have different curvature radii on the top and bottom surfaces thereof, the battery may be effectively mounted on the electronic device (the loudspeaker and the like) having different curvature radii at the top and bottom curved surfaces. Thus, the grip feeling of the electronic device is improved, and also the internal space required inside the electronic device is minimized due to a match between space within the electronic device for disposing the battery and the shape of the battery, and thus technical effect of promoting miniaturization of the electronic device is present.

The invention claimed is:

1. A battery comprising:
    a first surface having a perimeter of a closed curve defined by a first curved side and a second curved side connected to the first curved side;
    a second surface having a perimeter of a closed curve defined by a first curved side and a second curved side; and
    a volume portion configured to connect the first surface to the second surface, the volume portion having a first surface connecting the first curved side of the first surface to the first curved side of the second surface and a second surface connecting the second curved side of the first surface to the second curved side of the second surface,
    wherein the first surface has an area different from that of the second surface.

2. The battery of claim 1, wherein each of the first curved sides and the second curved sides is a circular arc.

3. The battery of claim 2, wherein the first and second curved sides of the first surface have the same curvature center.

4. The battery of claim 3, wherein the first and second curved sides of the first surface have the same central angle.

5. The battery of claim 2, wherein at least one curvature radius of the first curved side and the second curved side of the first surface is different from each curvature radius of the first curved side and the second curved side of the second surface.

6. The battery of claim 5, wherein all curvature radii of the first curved side and the second curved side of the first surface are less than each curvature radius of the first curved side and the second curved side of the second surface.

7. The battery of claim 1, wherein the first surface is parallel to the second surface.

8. The battery of claim 1, wherein the volume portion is defined by connecting the perimeter of the first surface to the perimeter of the second surface in a straight line.

9. The battery of claim 1, wherein all of the first curved sides and all of the second curved sides have the same central angle when viewed vertically.

10. The battery of claim 1, wherein the overall shape of the battery is a partial frustoconical shape.

11. The battery of claim 1, wherein ends of the first curved side and the second curved sides of the first surface are connected by straight sides extending therebetween.

12. The battery of claim 11, wherein ends of the first curved side and the second curved sides of the second surface are connected by straight sides extending therebetween.

* * * * *